United States Patent [19]
Strait

[11] Patent Number: 6,044,571
[45] Date of Patent: Apr. 4, 2000

[54] BORE MEASUREMENT APPARATUS AND METHOD

[75] Inventor: David S. Strait, Lyle, Wash.

[73] Assignee: Climax Portable Machine Tools, Inc., Newberg, Oreg.

[21] Appl. No.: 08/910,407

[22] Filed: Aug. 13, 1997

[51] Int. Cl.[7] .............................. B23B 25/06; G01B 5/08; G01B 5/12; B27G 23/00
[52] U.S. Cl. ............................. 33/555.1; 33/832; 33/542; 33/637
[58] Field of Search .................................. 33/555.1, 832, 33/833, 542, 544, 555.3, 636, 637

[56] References Cited

U.S. PATENT DOCUMENTS

| | | | |
|---|---|---|---|
| 1,421,073 | 6/1922 | Furness et al. ............................ | 33/636 |
| 1,678,030 | 7/1928 | Yount ........................................ | 33/636 |
| 2,107,558 | 2/1938 | Zimmerman ............................... | 33/637 |
| 2,441,716 | 5/1948 | Mitchell .................................... | 33/637 |
| 2,872,736 | 2/1959 | Abbott ...................................... | 33/637 |
| 2,891,317 | 6/1959 | Wood ........................................ | 33/637 |
| 4,251,922 | 2/1981 | Perlotto .................................... | 33/832 |
| 4,433,488 | 2/1984 | Baumgartner ............................. | 33/637 |
| 4,484,391 | 11/1984 | Narimatsu . | |
| 4,578,868 | 4/1986 | Sasaki et al. ............................. | 33/819 |
| 4,623,286 | 11/1986 | Hitt . | |
| 4,769,919 | 9/1988 | Lloyd et al. . | |
| 4,930,227 | 6/1990 | Ketchpel ................................... | 33/758 |
| 5,253,431 | 10/1993 | Smith . | |
| 5,327,653 | 7/1994 | Pistorius et al. . | |
| 5,491,907 | 2/1996 | Vidmar ..................................... | 33/832 |

*Primary Examiner*—Christopher W. Fulton
*Attorney, Agent, or Firm*—Dellett and Walters

[57] ABSTRACT

A bore measurement apparatus and method is provided for measuring with a single apparatus the inner diameter of a bore and the outer diameter of a cutting tool mounted on a boring bar. The apparatus comprises a set of clamping jaws secured to an elongate bar having a magnetic graduated strip positioned thereon, an indicating head slidably mounted on the elongate bar, and a measurement arm having a stylus, the measurement arm slidably mounted on the indicating head for movement between an inner measurement position wherein the stylus contacts the inner surface of a bore and an outer measurement position wherein the stylus contacts the upper surface of a cutting tool.

20 Claims, 5 Drawing Sheets

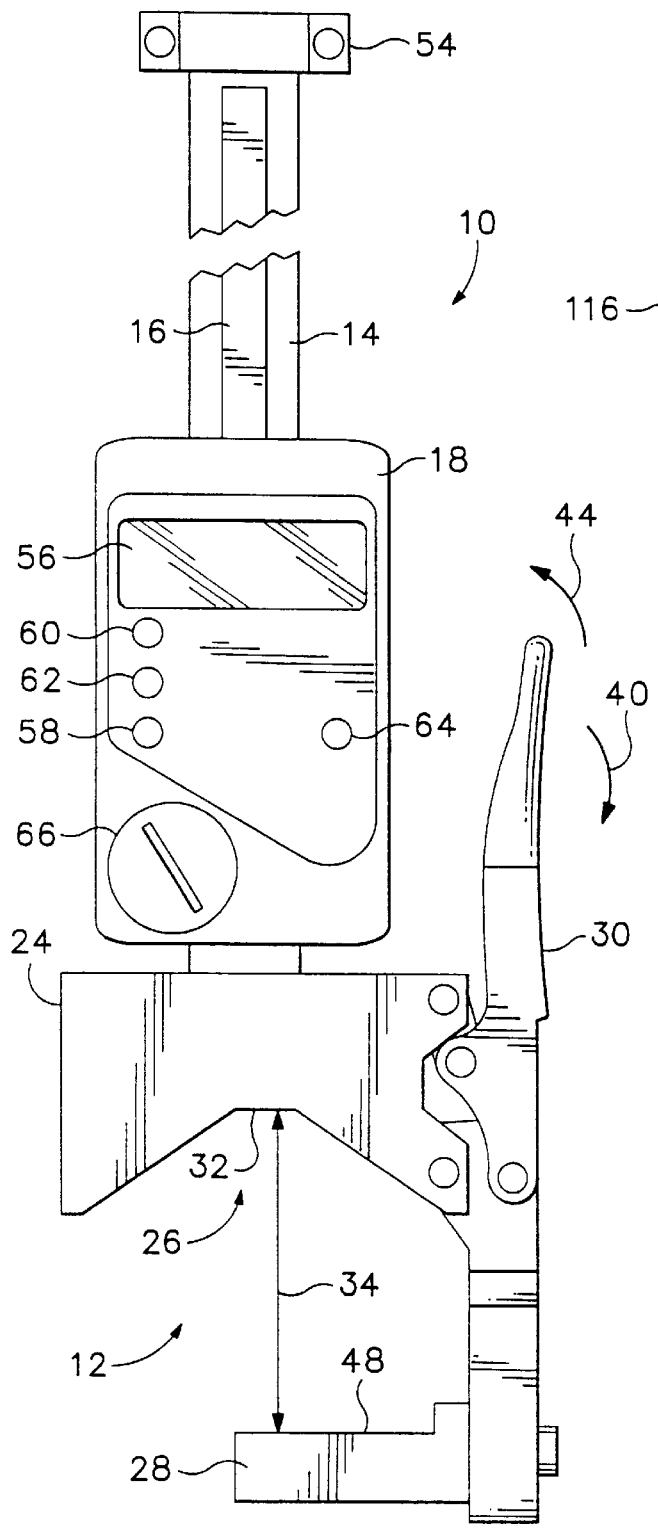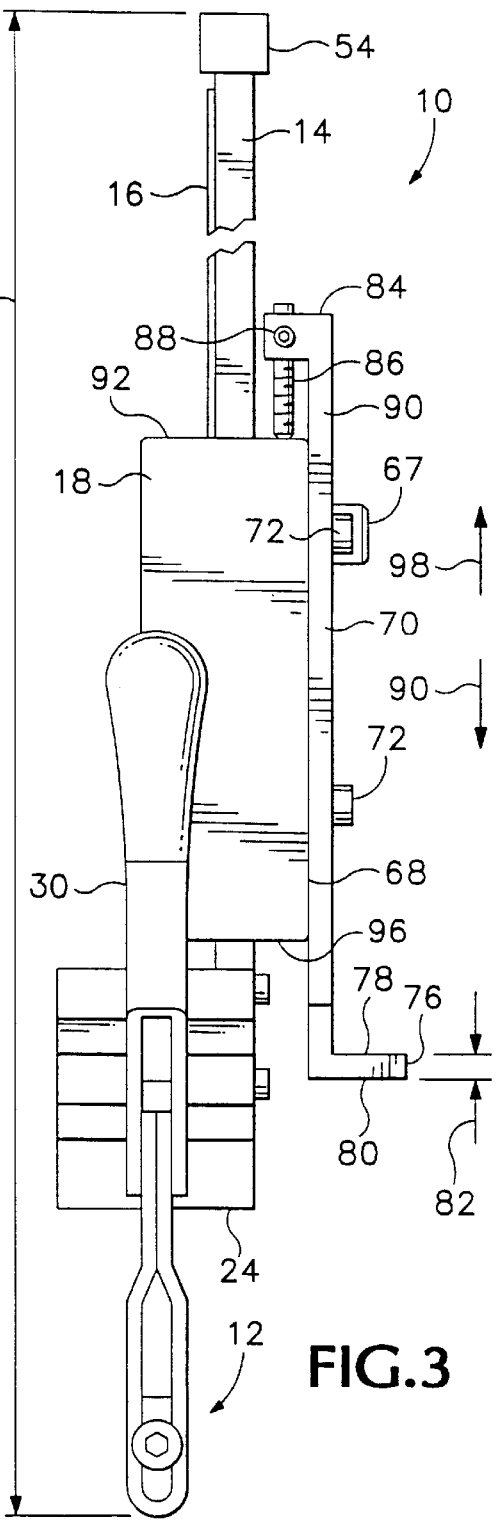
FIG.1
FIG.3

BORE MEASUREMENT APPARATUS AND METHOD

BACKGROUND OF THE INVENTION

This invention relates to a bore measurement apparatus and method and, more particularly, to a bore measurement apparatus and method for measuring with a single measurement apparatus the inner diameter of a bore and the height of a cutting tool mounted on a boring bar, without adjusting the apparatus.

The inner diameter of a bore typically is measured with calipers which are placed within the bore and then extended outwardly to measure the bore's inner diameter. To place the calipers within the bore, a boring bar for mounting a cutting tool thereon should be removed from the bore. After measuring the inner diameter, the boring bar must be remounted within the bore and the cutting tool adjusted thereon prior to beginning the next cutting iteration. Removal of the boring bar is also generally required for measurement of the inner diameter with a micrometer. Repeated removal and remounting of the boring bar in the bore for each iteration of the cutting process is time consuming and may lead to mispositioning of the apparatus and inaccurate cutting of the bore's inner surface. Moreover, the use of calipers or a micrometer to measure the inner diameter of a bore may lead to inaccurate measurements because an operator must visually read the diameter from the device.

The height of a cutting tool mounted on a boring bar typically is measured with calipers by placing one caliper arm on the upper edge of the cutting tool and one arm on the bottom of the boring bar directly opposite from the cutting tool. The operator then subtracts the diameter of the boring bar from the measurement to determine the cutting tool height. The use of calipers to measure the height of a cutting tool, or the diameter of a bore that would be cut by the cutting tool, may lead to inaccurate measurements because the operator must visually read the measurement from the device. This disadvantage is also present when measuring the outer diameter of the cutting tool with a micrometer. In addition, the elongate caliper arms or the micrometer measurement screw, in certain situations, may not fit within the bore to measure the inner diameter or may not fit around the boring bar and the cutting tool to measure the outer diameter.

SUMMARY OF THE INVENTION

In accordance with the invention, a bore measurement apparatus and method is provided for measuring the inner diameter of a bore and the height of a cutting tool mounted on a boring bar without calibration of the apparatus between the two different types of measurements. The apparatus comprises a set of clamping jaws secured to an elongate bar having a magnetic graduated strip positioned thereon, an indicating head slidably mounted on the elongate bar, and a measurement arm having a stylus, the measurement arm being slidably mounted on the indicating head for movement of the stylus between inner and outer measurement positions.

Accordingly, it is an object of the present invention to provide an improved bore measurement apparatus and method for measuring the inner diameter of a bore and the height of a cutting tool.

It is a further object of the present invention to provide an improved bore measurement apparatus and method which facilitates measurement of the inner diameter of a bore without removing a boring bar therefrom.

It is yet another object of the present invention to provide an improved bore measurement apparatus and method which facilitates measurement with a single apparatus of the inner diameter of a bore and the height of a cutting tool mounted on a boring bar without adjustment of the apparatus.

It is still another object of the present invention to provide an improved bore measurement apparatus and method which facilitates digital display of the inner diameter and cutting tool height measurement dimensions.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 1 is a front elevational view of the bore measurement apparatus with the clamping jaws in a closed position;

FIG. 3 is a side elevational view of the bore measurement apparatus shown in FIG. 1;

DETAILED DESCRIPTION

Figure 2:
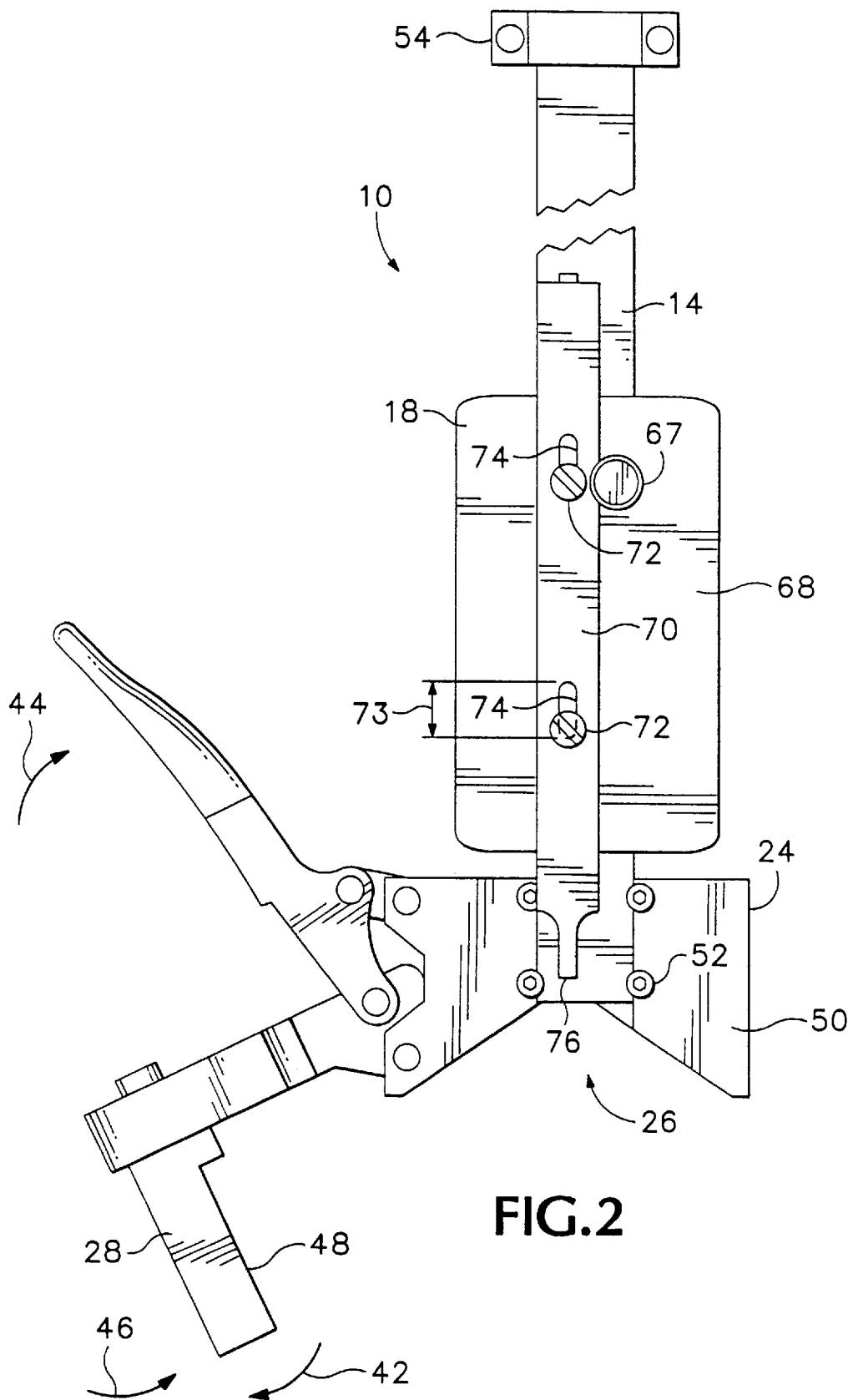
FIG. 2 is a rear elevational view of the bore measurement apparatus with the clamping jaws in an open position.

Referring to FIG. 1, a front elevational view of the bore measurement apparatus with the clamping jaws in a closed position, the system according to a preferred embodiment of the present invention comprises a bore measurement apparatus 10 including a set of clamping jaws 12 secured to an elongate bar 14 having a magnetic graduated strip 16 positioned thereon, and an indicating head 18 slidably mounted on the elongate bar. The indicating head includes an internal magnetic reader for reading magnetic graduated strip 16. Indicating head 18 may be purchased as a complete unit, i.e., the Digimatic Scale Unit 572, from the Mitutoya Company of Japan. Clamping jaws 12 include a stationary upper clamping jaw 24 having a recessed region 26 for receiving a boring bar therein, and a movable lower clamping jaw 28 pivotally secured to upper clamping jaw 24 by a clamp arm 30. Clamp arm 30 may be purchased as a premanufactured unit from the Stenco Company.

In the closed position, as shown in FIG. 1, lower clamping jaw 28 is positioned directly below and spaced apart from a recessed surface 32, also called a V-base, of upper jaw 24 by a distance 34 of approximately 4.0 in (10.2 cm). In the preferred embodiment distance 34 is approximately the same as a diameter 36 of a boring bar 38 (FIG. 4) such that the clamping jaws may be releasably secured to the boring bar. Lower clamping jaw 28 can be adjusted with respect to upper clamping jaw 24 by adjusting the securing machine bolt 29 on clamp arm 30 which secures jaw 28 thereto. Clamping jaws of different dimensions may also be used such that apparatus 10 may be secured to boring bars having differing dimensions.

To secure the clamping jaws to the boring bar, clamp arm 30 is moved outwardly along arc 40 from upper clamping jaw 24 such that lower clamping jaw 28 pivots away from the upper clamping jaw along arc 42, as shown in FIG. 2. Recessed region 26 of upper clamping jaw 24 is then positioned over the boring bar. Clamp arm 30 is moved inwardly along arc 44 toward the upper clamping jaw to move the lower clamping jaw upwardly along arc 46 toward the boring bar. In this manner, the clamping jaws securely fasten bore measurement apparatus 10 to a boring bar. Lower jaw 28 typically has a flat bar-contacting surface 48 so that the lower jaw will contact the boring bar at only a point thereby ensuring that the clamping jaws are secured to the boring bar across the full diameter of the boring bar. The operator must be careful, however, that the clamping jaws are not positioned over a keyway 49 (FIG. 4) of the boring bar when the jaws are fastened thereto in order to avoid inaccurate measurements. Accordingly, clamping jaws 12 ensure quick and accurate mounting of apparatus 10 on the boring bar for measurement of the inner diameter of a bore or the height of a cutting tool mounted on the boring bar. Other means for securing the apparatus to a boring bar, as known by those skilled in the art, may also be utilized.

Referring to FIG. 2, a rear elevational view of the bore measurement apparatus with the clamping jaws in an open position, lower clamping jaw 28 is shown moved away from stationary upper clamping jaw 24 to facilitate placement of the apparatus on a boring bar. Elongate bar 14 is secured to a backside 50 of the upper clamping jaw by four fasteners 52. The fasteners preferably are tightened so that the elongate bar is immobile with respect to the upper stationary clamping jaw and so that the elongate bar does not extend downwardly into recessed region 26, which would hinder placement of the boring bar within the clamping arms.

Indicating head 18 is slidably mounted on elongate bar 14 such that the indicating head surrounds the elongate bar and moves along the elongate bar with respect to boring bar 38. Elongate bar 14 includes a stop 54 such that the indicating head cannot inadvertently be removed from the elongate bar. As shown in FIG. 1, indicating head 18 includes a read out window 56, an ON/ZERO switch 58, an OFF/DATA switch 60, and a HOLD switch 62. The indicating head further includes a unit conversion switch 64 for switching the display units from inches to millimeters and vice versa, a battery compartment 66, and internal circuitry (not shown) having a memory, as known by those skilled in the art. A lock screw 67 (FIG. 2) may be tightened to secure the indicating head against movement with respect to the elongate bar. The lock screw does not hinder movement, however, of a measurement bar 70 (FIG. 2) secured to the indicating head.

The internal circuitry and magnetic reader of the indicating head facilitates magnetic measuring of the position of the indicating head along magnetic graduated strip 16 as the indicating head is moved along the elongate bar from an operator preset zero position. Accordingly, as the indicating head is moved along the magnetic strip, the distance of the indicating head from the preset zero position is displayed in the read out window.

In another embodiment, the indicating head may include a preset button to input the known diameter of the boring bar into the internal memory. A mathematical formula to determine a diameter position of the indicating head may be input into the memory of the internal circuitry prior to delivery to a customer. Based on the input of the known diameter of the boring bar, as the indicating head is moved along the magnetic strip, the read out window digitally displays the diameter position of the measurement bar mounted on the indicating head with respect to the center of the boring bar. In another embodiment, the indicating head may further comprise a reverse mode button to change the direction of the counting direction along the magnetic graduated strip.

Referring again to FIG. 2, indicating head 18 includes a back surface 68 having measurement bar 70 slidably mounted thereon by use of fasteners 72. Fasteners 72 are received within elongate slots 74 of the measurement bar such that the extent of movement of the measurement bar with respect to the indicating head is determined by a length 73 of slots 74. In the preferred embodiment, length 73 of slots 74 is approximately 0.4 in (1.0 cm).

Referring to FIG. 3, a side elevational view of the bore measurement apparatus shown in FIG. 1, measurement bar 70 further includes a stylus 76 extending outwardly and away from back surface 68 of the indicating head, the stylus including a top surface 78 and a bottom surface 80 separated by a stylus thickness 82 of approximately 0.2 in (0.5 cm). The thickness of the stylus may be varied but should be less than the length of elongate slots 74, as will be described below.

Measurement bar 70 also includes an arm 84 extending inwardly and toward elongate bar 14, the arm including therein a set screw 86 and a locking screw 88. Set screw 86 may be tightened in a downward direction 90 such that the set screw contacts a top surface 92 of indicating head 18 as measurement bar 70 is moved in the downward direction with respect to the indicating head. As set screw 86 is further tightened, the extent of movement of the measurement bar with respect to the indicating head is lessened. In other words, tightening of set screw 86 a predetermined extent restricts the movement of measurement bar 70 with respect to indicating head 18 to a distance that is less than length 73 of elongate slots 74. Set screw 86 may be secured in place by tightening of locking screw 88.

Figure 4:
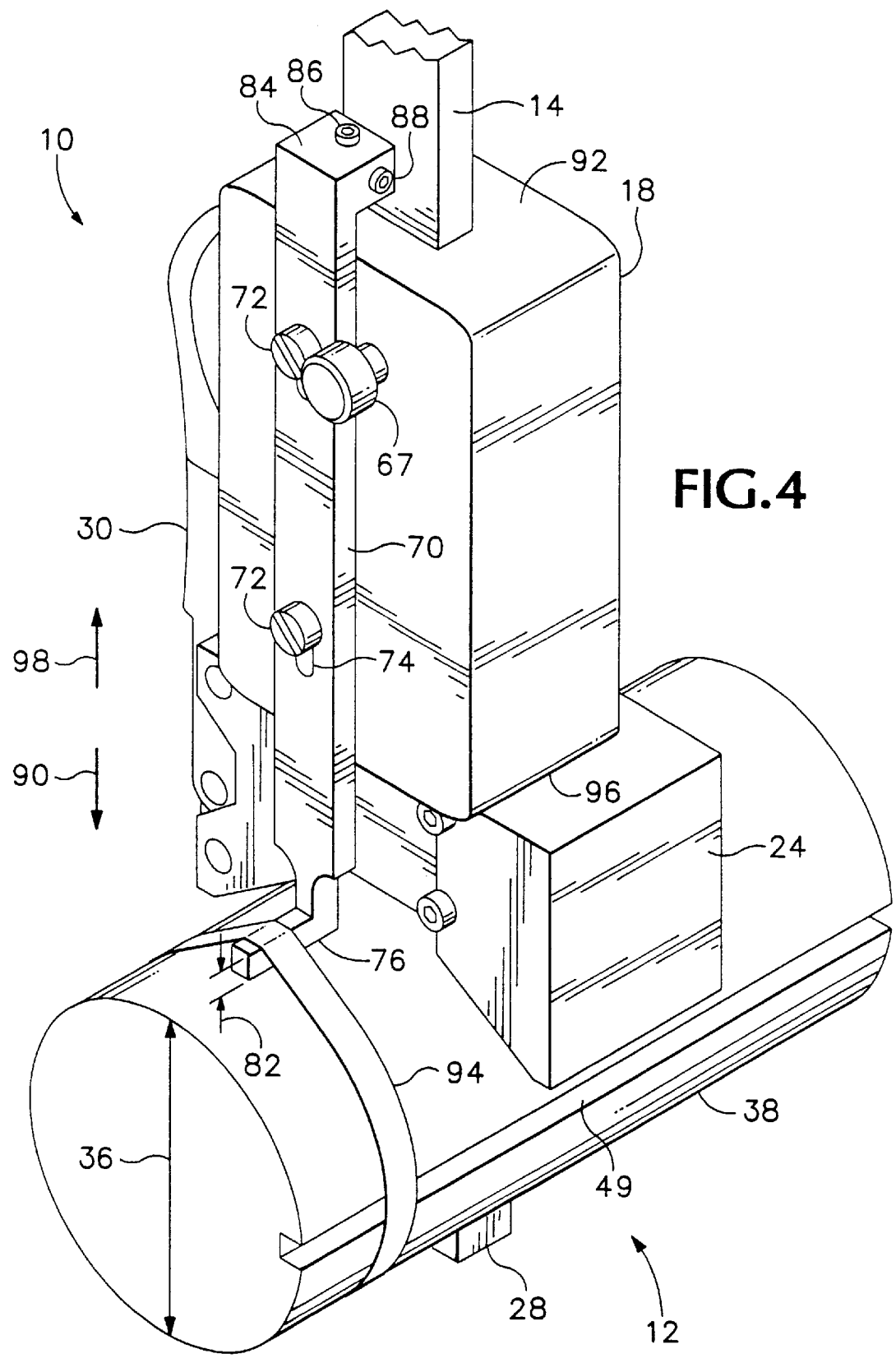
FIG. 4 is a rear isometric view of the bore measurement apparatus mounted on a boring bar with the stylus clamped to the boring bar for calibration of the apparatus.

Referring to FIG. 4, a rear isometric view of the bore measurement apparatus mounted on a boring bar with the stylus tied to the boring bar for calibration of the apparatus, calibration of the apparatus will be described. To calibrate apparatus 10 for measurement of the inner diameter of a bore and the height of a cutting tool mounted on a boring bar without calibration of apparatus 10, thickness 82 of stylus 76 is first measured by use of calipers or a micrometer, as known in the art. Apparatus 10 is secured to boring bar 38 by clamping jaws 12 and stylus 76 is secured to the boring bar by use of a clamping wire 94. The indicating head is moved downwardly in a direction 90 until fasteners 72 are positioned within the lowermost portion of elongate slots 74. The operator sets the ON/ZERO switch 58 to zero. Indicating head 18 is then moved in an upward direction 98 until read out window 56 shows a number which is the same as the previously measured thickness of the stylus, as measured with the calipers or micrometer. The measurement bar is secured in this desired position by tightening lock screw 67. Set screw 86 in arm 84 is tightened until it contacts top surface 92 of the indicating head. Locking screw 88 is tightened to retain the set screw in place. Lock screw 67 is then loosened to allow movement of the measurement bar. In this calibrated configuration, the length of movement of measurement bar 70 with respect to fasteners 72 of the indicating head has the same dimension as the thickness of the stylus, which is less than the full extent of movement of the measurement bar as defined by the full length of elongate slots 74 when such movement is not hindered by set screw 86. This calibration process typically is carried out at the end of the manufacturing process and before shipping of the apparatus to a customer.

Upon receipt of the apparatus, a customer may wish to check the calibration. To check the calibration, the customer secures the apparatus to a boring bar with the clamping jaws and secures the stylus to the boring bar with a clamping wire or like device. The customer moves the indicating head downwardly until fasteners 72 are positioned within the lowermost portion of elongate slots 74. The read out window should display "0.0". The customer then moves the indicating head upwardly to its fullest extent. The read out window should display 0.2 in (0.5 cm), the nominal thickness of the stylus. If the read out display is not accurate, or if the customer determines that the stylus has a thickness other than 0.2 in (0.5 cm), the customer may perform the above described calibration process.

Figure 5:
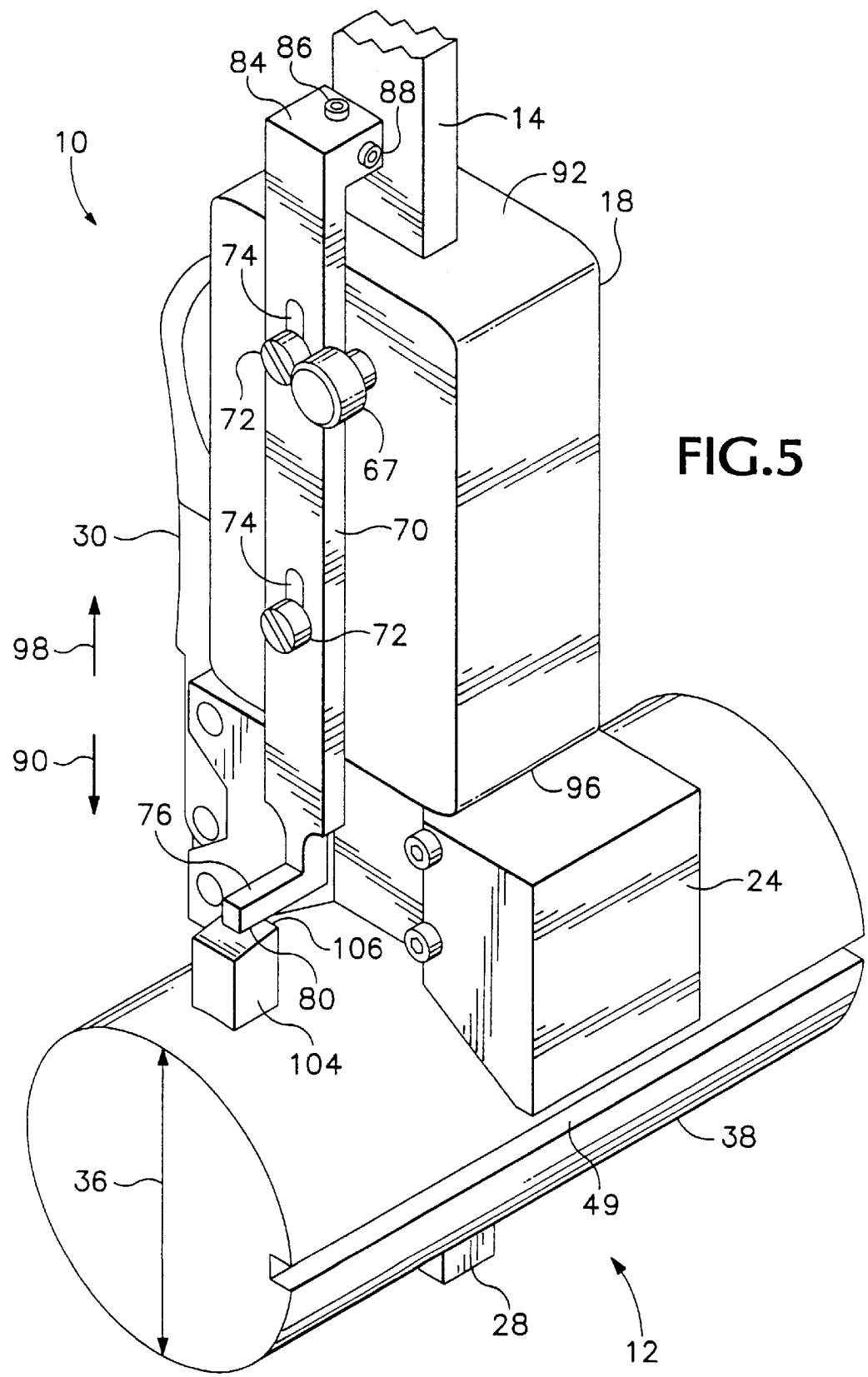
FIG. 5 is a rear isometric view of the bore measurement apparatus mounted on a boring bar with the bottom surface of the stylus positioned on the upper edge of a cutting tool for measuring the height of the cutting tool.

Referring to FIG. 5, a rear isometric view of the bore measurement apparatus mounted on a boring bar with the bottom surface of the stylus positioned on the upper edge of a cutting tool for measuring the height of the cutting tool, the process of measuring the height of a cutting tool by use of apparatus 10 will be described. Indicating head 18 is first turned on. Clamping jaws 12 are then moved to the open position and are placed around boring bar 38. The clamping jaws are secured around the boring bar such that the jaws do not contact keyway 49 of the boring bar. The stylus should be positioned over the boring bar in a position where a cutting tool 104 will be secured to the boring bar. Indicating head 18 is then moved downwardly on elongate bar 14 in direction 90 until bottom surface 80 of the stylus contacts the boring bar and fasteners 72 are in the lowermost portion of slots 74. The operator then pushes the ZERO switch. The internal circuitry of the indicating head will set this position as the zero position and the read out window will display a reading of "0.0". The operator may move the indicating head away from the boring bar and then back to the zero position wherein bottom surface 80 of the stylus again touches the boring bar to recheck that the read out window displays "0.0".

Indicating head 18 is then moved upwardly on elongate bar 14 until the desired reading is displayed in the read out window for placement of the cutting tool on the boring bar. The desired reading is determined by the formula: desired indicator reading to set the cutting tool is equal to $(B-D)/2$; wherein B is the desired outer diameter of the cutting tool (also known as the desired inner diameter of a bore to be cut by the cutting tool) and D is the known diameter 36 of the boring bar. Once the desired reading is displayed in the read out window, lock screw 67 is tightened to secure the indicating head in place on elongate bar 14. The operator then secures cutting tool 104 on the boring bar such that bottom surface 80 of stylus 76 contacts upper edge 106 of the cutting tool when the measurement bar is moved completely upwardly in direction 98 with respect to the indicating head, i.e., fasteners 72 are positioned in the lowermost portion of elongate slots 74. The cutting tool is then secured at the desired height. During this set up process the operator should experiment with and adjust for deflection of the boring bar so as to cut a precision diameter bore.

If the operator desires to know the height of a cutting tool that is already secured to the boring bar, the operator moves indicating head 18 upwardly and away from the stationary upper clamping jaw and secures the clamping jaws to the boring bar such that the stylus is positioned above the cutting tool. The operator then lowers indicating head 18 on elongate bar 14 such that fasteners 72 are positioned within the lowermost portion of elongate slots 74 and such that bottom surface 80 of the stylus contacts upper edge 106 of cutting tool 104. The height of the cutting tool above the boring bar is displayed on the indicating head. The diameter of a bore that would be cut by the cutting tool is determined by the following formula: bore diameter of the cutting tool=$(2\times R)+D$; wherein R is the reading displayed in the read out window and D is the known boring bar diameter. In another embodiment, this formula and the known boring bar diameter may be input into the indicating head memory so that the indicating head directly displays the bore diameter of the cutting tool.

Figure 6:
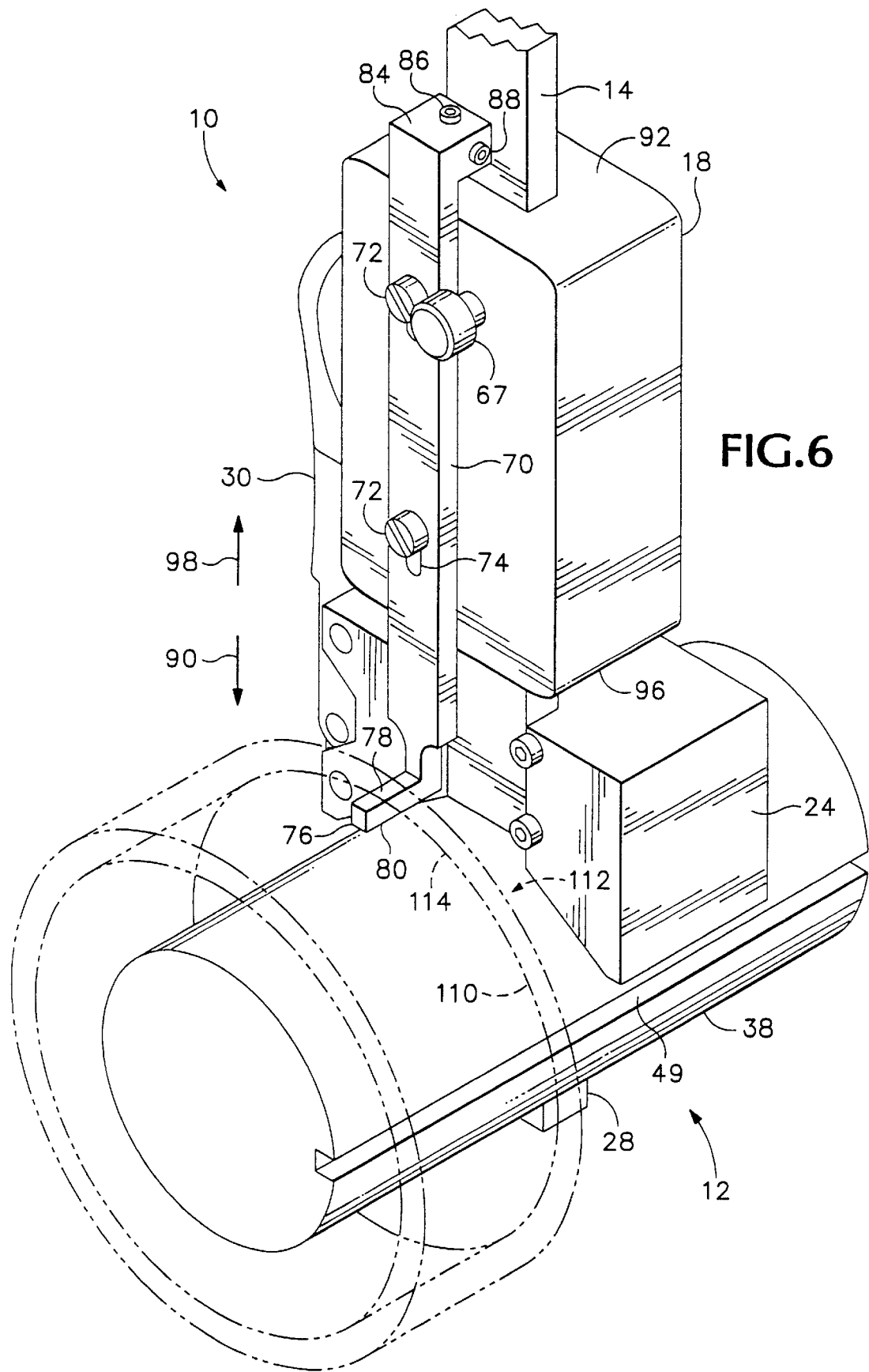
FIG. 6 is a rear isometric view of the bore measurement apparatus mounted on a boring bar with the top surface of the stylus positioned on the inner surface of a bore for measuring the inner diameter thereof.

Referring to FIG. 6, a rear isometric view of the bore measurement apparatus mounted on a boring bar with the top surface of the stylus positioned on the inner surface of a bore for measuring the inner diameter thereof, the process of measuring the inner diameter of a bore 110 will be described. Indicating head 18 is first turned on. Clamping jaws 12 are then moved to the open position and the jaws are placed around boring bar 38. The clamping jaws are secured around the boring bar such that the jaws do not contact keyway 49 of the boring bar. The stylus should be positioned over the boring bar in a position adjacent to and slightly within an opening 112 of bore 110. Indicating head 18 is then moved downwardly in direction 90 until bottom surface 80 of the stylus contacts the boring bar and fasteners 72 are in the lowermost portion of slots 74. The operator then pushes the ZERO switch. The internal circuitry will set this position as the zero position and read out window 56 will display a reading of "10.0". The operator may move the indicating head away from the boring bar and then back to the zero position wherein bottom surface 80 of the stylus again touches the boring bar to recheck that the read out window displays "0.0".

The operator then moves the indicating head upwardly and away from the boring bar such that top surface 78 of the stylus contacts an inner surface 114 of opening 112 of the bore. Indicating head 18 is further moved upwardly in direction 98 such that measurement bar 70 is moved downwardly with respect to the indicating head and so that fasteners 72 are positioned in the upwardmost portion of elongate slots 74. The inner diameter of the bore is then determined by the following formula: inner diameter of the bore=$(2\times R)+D$; wherein R is the reading displayed in the read out window and D is the known boring bar diameter. In another embodiment, this formula and the known bore diameter may be input into the indicating head memory so that the indicating head directly displays the inner diameter of the bore. Accordingly, there is described an apparatus that facilitates measurement of both the height of a cutting tool and the inner diameter of a bore without adjustment the apparatus.

In the preferred embodiment, the components of apparatus 10 are manufactured of steel for purposes of durability. Other materials, such as aluminum or engineered plastics, may also be used as known in the art. Apparatus 10 preferably has a length 116 (FIG. 3) of approximately 15 inches (38 cm), thereby providing an easily portable device. Any length may be utilized, however, as required for a particular application.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A measurement apparatus capable of measuring inner and outer diameters, comprising:

securement structure for securing said apparatus to a boring bar;

indicating structure movable with respect to said securement structure and adapted for indicating a distance of said indicating structure from said securement structure; and measurement structure movably connected to said indicating structure and adapted for movement between an inner measurement position and an outer measurement position.

2. A measurement apparatus capable of measuring inner and outer diameters according to claim 1 wherein said indicating structure is movably mounted on an elongate bar having graduations thereon, said elongate bar being secured to said securement structure.

3. A measurement apparatus capable of measuring inner and outer diameters according to claim 2 wherein said elongate bar includes a magnetic strip positioned thereon and wherein said magnetic strip includes said graduations.

4. A measurement apparatus capable of measuring inner and outer diameters according to claim 1 wherein said securement structure comprises a set of clamping jaws.

5. A measurement apparatus capable of measuring inner and outer diameters according to claim 1 wherein said measurement structure includes a stylus having a top surface and a bottom surface.

6. A measurement apparatus capable of measuring inner and outer diameters according to claim 5 wherein said measurement structure includes a calibration arm adapted for limiting movement of said measurement structure with respect to said indicating structure.

7. A measurement apparatus capable of measuring inner and outer diameters according to claim 6 wherein said calibration arm includes a set screw therein.

8. A measurement apparatus capable of measuring inner and outer diameters according to claim 7 wherein said measurement structure includes slots and wherein said measurement structure is secured to said indicating structure by fasteners received within said slots.

9. A measurement apparatus capable of measuring inner and outer diameters according to claim 8 wherein said stylus has a thickness and wherein said set screw is adjustable to allow movement of said measurement structure through a distance equal to the thickness of said stylus.

10. A measurement apparatus capable of measuring inner and outer diameters according to claim 1 wherein said indicating structure provides a digital indication of said distance of said indicating structure from said securement structure.

11. A method of using a measurement apparatus capable of measuring inner and outer diameters, comprising the steps of:

measuring a thickness of a stylus of a measurement structure;

adjusting a movement limiting device of said measurement structure such that said measurement structure is capable of movement with respect to an indicating structure only through a distance substantially equal to said thickness of said stylus.

12. A method of using a measurement apparatus capable of measuring inner and outer diameters according to claim 11 further comprising the steps of:

positioning the measurement structure of said measurement apparatus above an upper edge of a cutting tool secured to a boring bar;

securing the measurement apparatus to said boring bar;

moving said indicating structure of the measurement apparatus toward said cutting tool until said measurement structure contacts the upper edge of said cutting tool and is in an outer measurement position; and indicating on said indicating structure the outer diameter of said upper edge of said cutting tool.

13. A method of using a measurement apparatus capable of measuring inner and outer diameters according to claim 11 further comprising the steps of:

positioning the measurement structure below an inner surface of a bore;

securing the measurement apparatus to a boring bar mounted within said bore;

moving the indicating structure toward said inner surface until said measuring structure contacts said inner surface of said bore and is in an inner measurement position; and indicating on said indicating structure the inner diameter of said inner surface of said bore.

14. A bore measurement apparatus capable of measuring inner and outer diameters without adjustment, comprising:

securement structure for securing said apparatus to a boring bar;

elongate structure mounted on said securement structure;

indicating structure movably mounted on said elongate structure and adapted for indicating a distance of said indicating structure from said securement structure; and measurement structure movably connected to said indicating structure and adapted for movement between an inner measurement position and an outer measurement position.

15. A bore measurement apparatus capable of measuring inner and outer diameters without adjustment according to claim 14 wherein said elongate structure has a magnetically graduated strip positioned thereon.

16. A bore measurement apparatus capable of measuring inner and outer diameters without adjustment according to claim 14 wherein said securement structure comprises a set of clamping jaws.

17. A bore measurement apparatus capable of measuring inner and outer diameters without adjustment according to claim 14 wherein said measurement structure includes a stylus having a top surface and a bottom surface.

18. A bore measurement apparatus capable of measuring inner and outer diameters without adjustment according to claim 17 wherein said measurement structure includes a calibration arm and a set screw therein, said set screw adapted for limiting movement of said measurement structure with respect to said indicating structure.

19. A bore measurement apparatus capable of measuring inner and outer diameters without adjustment according to claim 18 wherein said measurement structure includes slots and wherein said measurement structure is secured to said indicating structure by fasteners received within said slots.

20. A bore measurement apparatus capable of measuring inner and outer diameters without adjustment according to claim 19 wherein said stylus has a thickness and wherein said set screw is adjustable to allow movement of said measurement structure through a distance substantially equal to the thickness of said stylus.

* * * * *